US008963861B2

(12) United States Patent
Lee

(10) Patent No.: US 8,963,861 B2
(45) Date of Patent: Feb. 24, 2015

(54) FOOD PROCESSOR HAVING TOUCH BUTTON DEVICE

(76) Inventor: Wen Ching Lee, Taichung (TW)

( * ) Notice: Subject to any disclaimer, the term of this patent is extended or adjusted under 35 U.S.C. 154(b) by 254 days.

(21) Appl. No.: 13/512,454

(22) PCT Filed: Mar. 18, 2011

(86) PCT No.: PCT/CN2011/071947
§ 371 (c)(1),
(2), (4) Date: Jun. 29, 2012

(87) PCT Pub. No.: WO2011/116669
PCT Pub. Date: Sep. 29, 2011

(65) Prior Publication Data
US 2012/0262402 A1 Oct. 18, 2012

(30) Foreign Application Priority Data
Mar. 26, 2010 (CN) ...................... 2010 2 0145046 U

(51) Int. Cl.
*G06F 3/041* (2006.01)
*A47J 43/046* (2006.01)

(52) U.S. Cl.
CPC ................................ *A47J 43/046* (2013.01)
USPC .......................................... 345/173; 366/206

(58) Field of Classification Search
CPC ........... A23G 9/045; A23G 9/22; A23G 9/28;
A47J 43/04; A47J 43/0716; A47J 43/06;
A47J 43/046; A47J 43/0727; A47J 43/0722;
A47J 2043/0449; A47J 43/085; A47J 43/042;
Y10S 388/936; Y10S 366/601; B01F 7/00275;
G06F 3/041; G06F 3/048

USPC ............... 345/173–178; 366/206; 241/199.12
See application file for complete search history.

(56) References Cited

U.S. PATENT DOCUMENTS

| 6,059,445 A * | 5/2000 | St John et al. ................. 366/205 |
| 2003/0048598 A1* | 3/2003 | Lee et al. ...................... 361/681 |
| 2008/0185281 A1* | 8/2008 | Chang et al. .................. 200/5 A |
| 2009/0168593 A1* | 7/2009 | Wulf et al. ..................... 366/206 |
| 2009/0176573 A1* | 7/2009 | Dreyer ............................ 463/37 |

(Continued)

FOREIGN PATENT DOCUMENTS

| CN | 201200347 Y | 3/2009 |
| CN | 201312752 Y | 9/2009 |

(Continued)

*Primary Examiner* — Liliana Cerullo
(74) *Attorney, Agent, or Firm* — Rosenberg, Klein & Lee

(57) ABSTRACT

A nutritious food processor includes a frame, a container mounted on top of the frame, and a housing mounted to the frame. A touch button device is mounted on the housing. The touch button device includes a touch screen coupled to the housing, a touch control board mounted to the touch screen, a film mounted between the touch screen and the touch control board, and a liquid crystal display fixed to the touch control board. The waterproof effect of the nutritious food processor is increased while simplifying the structure of the nutritious food processor. The technical sense of the product as well as the quality and positioning of the product are enhanced. The use is simple and durable. Since the touch button device overcomes the disadvantages of damage to the conventional press-type buttons resulting from pressing fatigue due to long-term use, the service life of the buttons is increased. Thus, the present invention provides the advantages of excellent waterproof effect at the frame, high technology, use convenience, and long service life of buttons.

6 Claims, 3 Drawing Sheets

(56) References Cited

U.S. PATENT DOCUMENTS

| | | | |
|---|---|---|---|
| 2010/0139493 A1* | 6/2010 | Nevarez et al. | 99/275 |
| 2011/0148800 A1* | 6/2011 | Nishikawa et al. | 345/173 |
| 2011/0189357 A1* | 8/2011 | Herbert | 426/231 |
| 2011/0228192 A1* | 9/2011 | Hollaway | 349/58 |
| 2011/0291958 A1* | 12/2011 | Wu et al. | 345/173 |

FOREIGN PATENT DOCUMENTS

| | | |
|---|---|---|
| CN | 201341409 Y | 11/2009 |
| CN | 201355582 Y | 12/2009 |
| CN | 201602657 U | 10/2010 |
| JP | 62265704 A | 11/1987 |

* cited by examiner

FOOD PROCESSOR HAVING TOUCH BUTTON DEVICE

TECHNICAL FIELD OF THE INVENTION

The present invention relates to a household kitchen appliance used in daily life and, more particularly, to a nutritious food processor.

BACKGROUND OF THE INVENTION

Currently popular nutritious food processors generally include micro switches or membrane buttons. In either way, a dome sheet is bonded to a frame of the food processor. However, a gap exists along a periphery of the dome sheet due to assembling tolerance. Furthermore, back glues for bonding the dome sheet have different waterproof effects. Thus, short circuit and rusting of components occur due to leakage of water into the frame, leading to malfunction. Further, a mechanical button includes a movable portion and a fixed portion, wherein the movable portion is often prematurely damaged. The membrane buttons are liable to malfunction after repeated pressing or in a hostile environment. Further, the nutritious food processors have a low product positioning due to barrack appearances and monotonous operation. Thus, a need exists for a nutrition food processor with buttons having an excellent waterproof effect and having a long service life.

BRIEF SUMMARY OF THE INVENTION

The present invention solves the technical problem by providing a nutritious food processor providing touch-type operation, having an excellent waterproof effect, having a long service life, and increasing the quality of positioning of the product. The present invention is carried out by the following technical solutions.

A nutritious food processor according to the present invention includes a frame, a container mounted on top of the frame, and a housing mounted to the frame. A touch button device is mounted on the housing. The touch button device includes a touch screen coupled to the housing, a touch control board mounted to the touch screen, a film mounted between the touch screen and the touch control board, and a liquid crystal display fixed to the touch control board.

Preferably, a positioning member is provided on each of upper and lower ends of the housing. The touch screen includes engaging portions engaged with the positioning members.

Preferably, a cushioning pad is mounted between each of the positioning members and one of the engaging portions.

Preferably, the touch screen is fixed by screws to the touch control board.

Preferably, a light-non-transmittable sleeve is mounted around each of the screws.

Preferably, the liquid crystal display is fixed by screws to the touch control board.

In the nutritious food processor, by providing the touch button device on the housing, openings and dome sheets are not required in the frame. Since the frame has no openings in the appearance, the waterproof effect of the nutritious food processor is increased while simplifying the structure of the nutritious food processor. The technical sense of the product as well as the quality and positioning of the product are enhanced. The use is simple and durable. Since the touch button device overcomes the disadvantages of damage to the conventional press-type buttons resulting from pressing fatigue due to long-term use, the service life of the buttons is increased. Thus, the present invention provides the advantages of excellent waterproof effect at the frame, high technology, use convenience, and long service life of buttons.

The present invention will become clearer in light of the following detailed description of illustrative embodiments of this invention described in connection with the drawings.

DETAILED DESCRIPTION OF THE INVENTION

Figure 1:
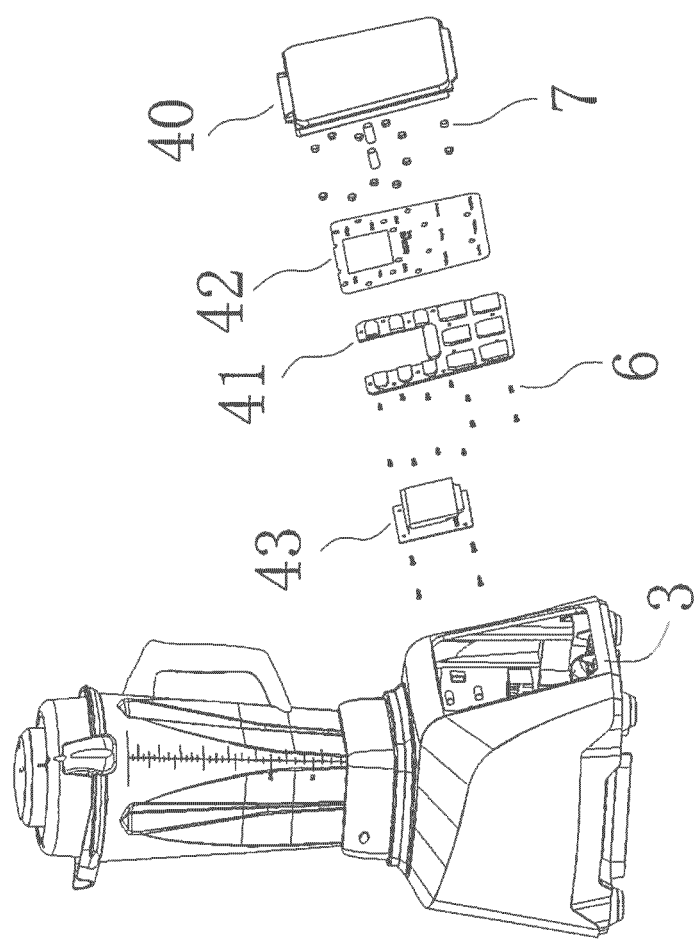
FIG. 1 shows an exploded, perspective view of a nutritious food processor according to the present invention.
Figure 2:
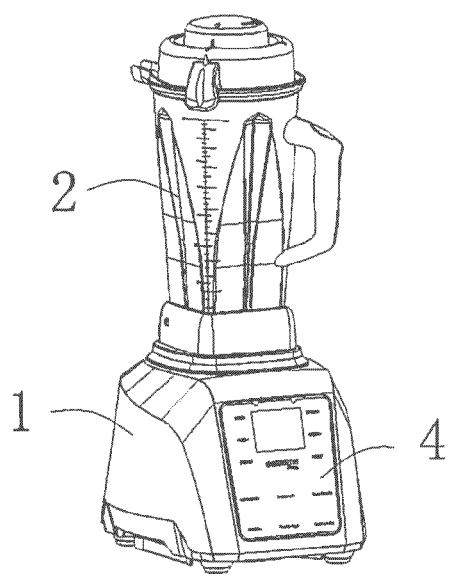
FIG. 2 shows a perspective view of the nutritious food processor according to the present invention after assembly.
Figure 3:
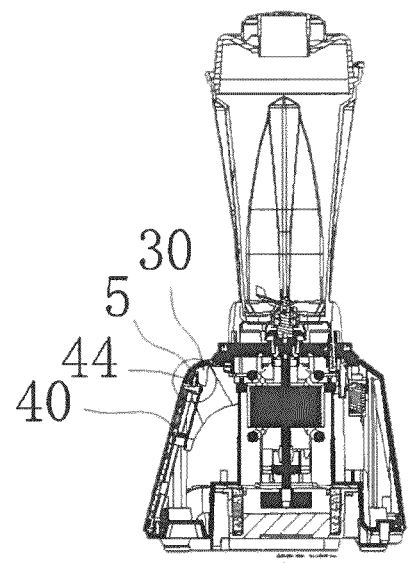
FIG. 3 shows a cross sectional view of the nutritious food processor according to the present invention.
Figure 4:
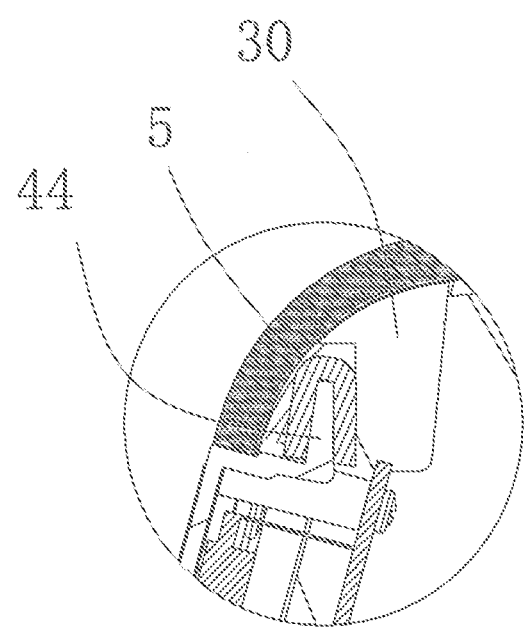
FIG. 4 shows an enlarged view of a circled portion in FIG. 3.

With reference to FIGS. 1-3, a nutritious food processor according to the present invention includes a frame 1, a container 2 mounted on top of the frame 1 and a housing 3 mounted to the frame 1. A touch button device 4 is mounted on the housing 3 and includes a touch screen 40 coupled to the housing 3, a touch control board 41 mounted to the touch screen 40, a film 42 mounted between the touch screen 40 and the touch control board 41, and an LCD (liquid crystal display) 43 fixed to the touch control board 41. A back light for the touch control board 41 transmits through the film 42 to display the whole operating panel. The nutritious food processor enhances the waterproof effect of the frame while simplifying the structure of the nutritious food processor. The technical sense of the product as well as the quality and positioning of the product are enhanced. The use is simple and durable, prolonging the service life.

A positioning member 30 is provided on each of upper and lower ends of the housing 3. The touch screen 40 includes engaging portions 44 engaged with the positioning members 30. By engagement between the positioning members 30 and the engaging portions 44, the touch screen 40 is reliably fixed to the housing 3. A cushioning pad 5 is mounted between each positioning member 30 and one of the engaging portions 44 to provide a buffering effect. The touch screen 40 is fixed by screws 6 to the touch control board 41. A light-non-transmittable sleeve 7 is mounted around each screw 6. The liquid crystal display 43 is fixed by screws 6 to the touch control board 41 and displays various information of the nutritious food processor.

In the nutritious food processor, by providing the touch button device on the housing, openings and dome sheets are not required in the frame. Since the frame has no openings in the appearance, the waterproof effect of the nutritious food processor is increased while simplifying the structure of the nutritious food processor. The technical sense of the product as well as the quality and positioning of the product are enhanced. The use is simple and durable. Since the touch button device overcomes the disadvantages of damage to the conventional press-type buttons resulting from pressing fatigue due to long-term use, the service life of the buttons is increased. Thus, the present invention provides the advantages of excellent waterproof effect at the frame, high technology, use convenience, and long service life of buttons.

The above embodiment is merely an example of the present invention and should not be used to limit the practice and the scope of the invention. Any technical solutions identical or equivalent to those illustrated in the claims are embraced by the claims.

The invention claimed is:

1. A nutritious food processor comprising:
a frame;
a container mounted on top of the frame;
a housing mounted to the frame, the housing defining a compartment and a peripheral wall portion extending about an opening of the compartment, the housing including a positioning member projecting into the compartment; and,
a touch button device mounted on the housing, the touch button device including:
 a touch screen coupled to the housing, the touch screen having an engaging portion peripherally extending therefrom to be retained between the positioning member and the peripheral wall portion of the housing,
 a touch control board mounted to the touch screen,
 a film mounted between the touch screen and the touch control board, and
 a liquid crystal display fixed to the touch control board.

2. The nutritious food processor as claimed in claim 1, wherein a positioning member is provided on each of upper and lower ends of the housing.

3. The nutritious food processor as claimed in claim 2, wherein a cushioning pad extends about each of the engaging portions to be retentively captured thereby against one of the positioning members and the peripheral wall portion of the housing.

4. The nutritious food processor as claimed in claim 1, wherein the touch screen is fixed by screws to the touch control board.

5. The nutritious food processor as claimed in claim 1, wherein a light-non-transmittable sleeve is mounted around each of the screws.

6. The nutritious food processor in claim 1, wherein the liquid crystal display is fixed by screws to the touch control board.

* * * * *